United States Patent [19]

Ghirardi et al.

[11] Patent Number: 5,727,096
[45] Date of Patent: Mar. 10, 1998

[54] PROCESS FOR MAKING A MONOLITHIC INTEGRATED STRUCTURE INCORPORATING OPTO-ELECTRONIC COMPONENTS AND STRUCTURE MADE IN THIS WAY

[75] Inventors: Frédéric Ghirardi, Paris; Louis Giraudet, Asnieres, both of France

[73] Assignee: France Telecom, France

[21] Appl. No.: 310,639

[22] Filed: Sep. 22, 1994

[30] Foreign Application Priority Data

Sep. 24, 1993 [FR] France ................... 93 11404

[51] Int. Cl.$^6$ ........................................ G02B 6/12
[52] U.S. Cl. ................................................. 385/14
[58] Field of Search ..................... 357/30; 385/14, 385/147

[56] References Cited

U.S. PATENT DOCUMENTS 5,122,852 6/1992 Chan et al. ................... 357/30

FOREIGN PATENT DOCUMENTS

| 0 422 854 A3 | 5/1990 | European Pat. Off. | G02B 6/12 |
| 0422854 | 5/1990 | European Pat. Off. | |
| 41 15 078 A1 | 12/1992 | Germany | G02B 6/12 |

OTHER PUBLICATIONS

Patent Abstracts of Japan, vol. 16, No. 130 (M-126) 24 Dec. 1991.
Patent Abstracts of Japan, vol. 15, No. 14 (M-892) 29 Oct. 1990.
Patent Abstracts of Japan, vol. 11, No. 288 (E-542) 23 Apr. 1987.
Electronics Letters, vol. 24, No. 23, 10 Nov. 1988.
Patent Abstracts of Japan, vol. 6, No. 71 (M-126) 6 May 1982.
Patent Abstracts of Japan, vol. 13, No. 506 (M-892) 14 Nov. 1989.
Patent Abstracts of Japan, vol. 14, No. 177 (M-960) 9 Apr. 1990.
Patent Abstract of Japan, vol. 16, No. 130 (M-126) 24 Dec. 1991.

*Primary Examiner*—Akm E. Ullah
*Attorney, Agent, or Firm*—Blakely Sokoloff Taylor & Zafman

[57] ABSTRACT

The invention relates to a process for making a monolithic integrated structure comprising two opto-electronic components (K, D1) connected optically by an optical guide.

It comprises the step consisting in making in situ between the two opto-electronic components at least one electrically insulating barrier (40) able to allow transmission of light between them, by one of the following means: localized doping with an element of conductivity of a given type, of a region of the structure of opposite conductivity type, epitaxial deposition of a layer of semi-insulating material.

4 Claims, 4 Drawing Sheets

PROCESS FOR MAKING A MONOLITHIC INTEGRATED STRUCTURE INCORPORATING OPTO-ELECTRONIC COMPONENTS AND STRUCTURE MADE IN THIS WAY

The present invention relates to the field of opto-electronics, and more especially to that of monolithic integrated structures involving common technology for making components rather then the assembling of components made separately. The invention applies in particular but not exclusively to the making of a heterodyne reception circuit.

The publication "Integrated balanced mixer receiver on InP, Trommer et al., 4th InP and Related Compounds Conference, WE3, Newport 1992" describes a monolithic integrated heterodyne reception circuit comprising two detection photodiodes connected electrically in series and a 3 dB-coupler including two optical guides. The coupler receives respectively as input in the optical guides a useful signal to be demodulated S and a reference signal R generated by a local oscillator and delivers as output on the two detection photodiodes two signals corresponding respectively to the half-sum and half-difference of the signals S and R. The photodiodes deliver electrical signals representing the square of the modulus of this half-sum and of this half-difference, in the form $S^2+2S.R+R^2$ and $S^2-2S.R+R^2$ respectively. The molting of the two photodiodes in series makes it possible to gather at the common point the difference of these two expressions, that is to say an electrical signal of the form 4S.R. It will be readily understood that the attraction of such a receiver resides in the elimination of the noise $R^2$ from the local oscillator as well as in the amplification of the useful signal S, the amplitude of the signal R being very large compared with that of the signal S. However, it is difficult in practice to make a completely balanced coupler, that is to say which is able to deliver precisely the half-sum and half-difference of the input signals S and R, so that it is necessary to make a large number of integrated structures and to sort out and discard those whose coupler is not properly balanced. In the structure described, the two optical guides are made on a semi-insulating substrate with semi-insulating materials so that problems of electrical insulation of the two photodiodes are not encountered.

By way of example of another known integrated monolithic structure, the publication "Directional Coupler, Balanced PIN Pair and JFET integrated on InP Towards Receiver OEICs, L. Giraudet et al., Proceeding of fourth optoelectronic conference, PDP, 14 Jul. 1992" will be cited. In this structure the two optical guides of the coupler are made in conducting materials and a leakage current is observed flowing through the optical guides between the electrodes of the two series-mounted photodiodes, and which degrades the performance of the structure. Making the two optical guides of the coupler in conducting materials nevertheless has the advantage of enabling it to be electrically balanced by means of the application of an electrical voltage or an injection of electrical current via two contact electrodes made on the coupler, and each associated with an optical guide. This injection of current or applied voltage causes a variation of the index of the material constituting the guiding layer of the optical guides and thus makes it possible to adjust the phase of the light signals propagating in the material.

It has elsewhere been proposed, in the publication "Balanced Operation of a GaInAs/GaInAsP Multiple-Quantum-Well Integrated Heterodyne Receiver, IEEE Photonics Technology Letters Vol.2, No 8., August 1990" not to connect the two photodiodes in series on the same structure, so as to circumvent problems of leakage current between the electrodes of the two photodiodes. The electrical signals delivered by each of the two photodiodes are amplified separately and then subtracted one from the other in order to eliminate the aforesaid terms in $S^2$ and $R^2$. The separate amplification of the electrical signals delivered by each of the photodiodes has the drawback of no longer suppressing the noise due to the variation in $R^2$.

Described in the Patent U.S. Pat. No. 5,122,852 is an integrated structure including two semiconductor detectors arranged on a common substrate and each associated with an optical guide. The substrate and the guides are formed from non-semiconducting insulating materials which, although they do not create any electrical insulation problems, do not allow monolithic integration of the detectors which must be made using a so-called "epitaxial lift-off" technique which is complex to implement. The structure described, which is not a monolithic integrated structure, is thus expensive to produce.

It was proposed in the publication ELECTRONICS LETTERS, Vol. 24, No. 23, 10 Nov. 1988, STEVENAGE GB, pages 1457–1458, S. Chandrasekhar et al., "Balanced dual photodiodes integrated with a 3 dB directional coupler for coherent lightwave receivers", to reduce the leakage current due to using a conducting material for an optical guide by decreasing the latter's cross section and increasing its length. The resistivity of the guide still remains fairly low, of the order of a MΩ, and in any event dependent upon the length of the guide, which then creates a problem of bulk and cost of production.

Described in the publication "22 GHz Photodiode monolithically integrated with optical waveguide on semi-insulating InP using novel Butt-Joint structure, Kato et al., Electronic Letters, 1992, pp 1140–1143" is a means of making an insulating layer on the end slice of an optical guide, between the latter and a photodiode. A vertical trench is etched after making the guide and the photodiode by reactive ion-beam erosion (RIBE) in order to separate the photodiode and the optical guide, and a silica film constituting the insulating layer is deposited in this trench by means of a magnetron. It is difficult, by this method, to control the width of the trench which is etched, and hence the thickness of the amorphous silica film which is made between the photodiode and the optical guide, in order to obtain the particular value of film thickness which ensures optimal transmission of light between the optical guide and the photodiode.

Described in the publication JP-A-03 292 777 is an integrated structure in which an insulating barrier is grown epitaxially after the constituent layers of a semiconductor laser and of a detector. These two components are made on a conducting substrate and retain a common electrode, so that the isolation between the two components is not complete. Similarly, proposed in the publication EP-A-0 422 854 is a structure in which a photodetector and an optical amplifier retain a common electrode.

The present invention aims to remedy the aforesaid drawbacks and its subject is a process for making a monolithic integrated structure including two opto-electronic components connected optically by an optical guide, comprising the step consisting in making, between the two opto-electronic components, at least one electrically insulating barrier able to allow transmission of light between them, characterized in that the said barrier is made in situ.

Thus, unlike what has been proposed in the prior art, it is not necessary accurately to etch a trench which must subsequently be filled with an insulating material. In the invention, the insulating barrier is made while producing the components of the structure or after producing them but without it being necessary to erode a trench situated in the path of the light within the structure between these two components.

Advantageously, the transmission of light between one at least of the opto-electronic components and the optical guide is effected by evanescence. As a variant, it is effected by butt-coupling.

In a first implementation of the process according to the invention, the insulating barrier is made by localized doping with at least an element of a given type of conductivity of at least one region of the structure of opposite conductivity type.

Preferably, the doping is performed by deep diffusion, from the surface of the structure down to an insulating substrate of the structure, through the optical guide, of the said element. As a variant, it is performed by ion implantation, from the surface of the structure down to an insulating substrate of the structure, through the optical guide, of the said element. Preferably, the said element is of p+ type conductivity. If appropriate, when the structure includes at least one first and one second superposed layer of opposite conductivity types, a doping of a region of the first layer is performed with a first element of opposite conductivity type to that of this first layer and a doping of a region of the second layer, offset from the region of the first layer, with a second element of opposite conductivity type to that of the second layer and of the first element, so as to make, between the two opto-electronic components, two insulating junctions of npn and pnp type. Several insulating junctions placed in series can be made in the same way in order to improve the insulation.

As a variant, the doping is carried out by incorporation of an element of given conductivity type into an intermediate layer of the structure, deposited by epitaxy, and situated immediately above and below two layers of the structure of opposite conductivity type to that of the said element.

Preferably, the said element is of p+ type conductivity.

In a second implementation of the process according to the invention, the insulating barrier is made by epitaxial deposition of a layer of semi-insulating material. Preferably, the said semi-insulating material consists of indium phosphide incorporating iron.

Advantageously, an optical impedance matching layer of n+ type conductivity is deposited between the optical guide and that one at least of the opto-electronic components for which the transmission of light is effected by evanescence with the optical guide.

The process according to the invention is advantageously used to make a monolithic integrated structure of a heterodyne reception circuit comprising two detection photodiodes connected electrically in series and a 3 dB-coupler able to be electrically balanced, the coupler constituting one of the said opto-electronic components and each photodiode constituting the other of the said opto-electronic components.

The subject of the invention is also a monolithic integrated structure including two opto-electronic components connected optically by an optical guide, characterized in that it includes, between the two opto-electronic components, an electrically insulating barrier able to allow the transmission of light between them, and formed in situ.

In one embodiment, the barrier is formed by doping with an element of conductivity of a given type at least one region of the structure of opposite conductivity type.

In another embodiment, the barrier is formed by the epitaxial deposition of a layer of semi-insulating material between the optical guide and this opto-electronic component.

A further subject of the invention is a monolithic integrated heterodyne reception circuit including two detection photodiodes connected electrically in series and an electrically adjustable 3 dB-coupler, an electrically insulating barrier being formed in situ between the detection photodiodes and the coupler, this barrier being able to allow the transmission of light between the coupler and the detection photodiodes.

Other features and advantages of the present invention will emerge on reading the detailed description which will follow, of two non-limiting illustrative embodiments of the invention and on examining the appended drawing in which:

Figure 1:
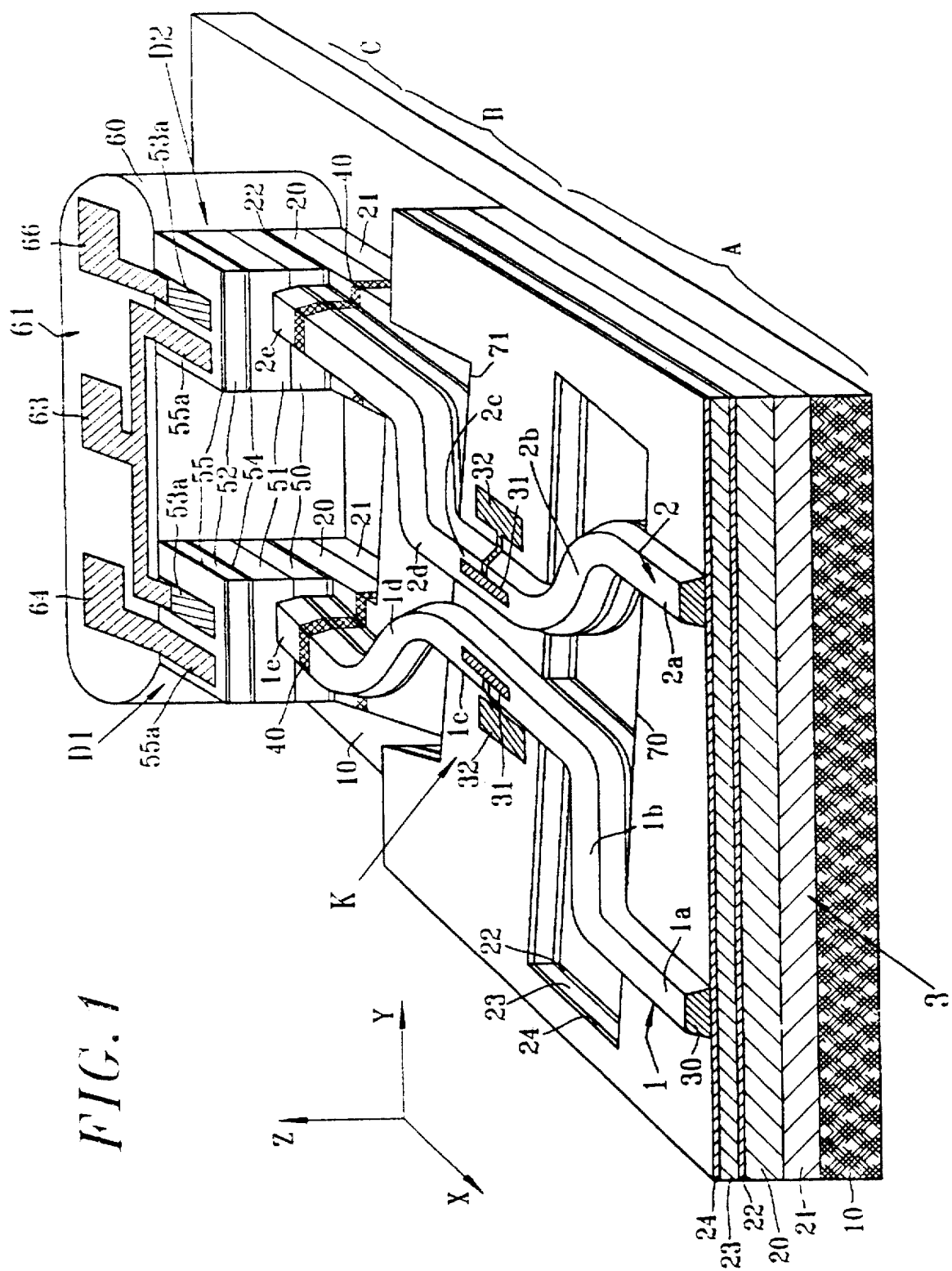
FIG. 1 is a diagrammatic, perspective view of a monolithic integrated structure in accordance with a first embodiment of the invention.

In the whole of the description which follows the terms or collection of terms "length, front, rear", "lateral" and "thickness, vertical, upper, lower" will refer respectively to distances or locations along the X-, Y- and Z-axes of a reference frame (X, Y, Z) for the Figures.

The two monolithic integrated structure examples represented in FIGS. 1 to 4 are each made in accordance with the process according to the invention and both relate to heterodyne reception circuits comprising two detection photodiodes D1 and D2, of PIN type, connected electrically in series and an electrically adjustable 3 dB-coupler, labelled K, including two optical guides exhibiting in their upper part guiding strips labelled 1 and 2 for each optical guide respectively.

These two integrated structures are generally symmetric with respect to a mid-plane of symmetry parallel to the XZ-plane.

The introduction of light into the optical guides is performed via the front forward face 3 of the structure, which is plane and perpendicular to the X-axis, in a guiding layer 20 bordered above and below by lower 21 and upper 22 confinement layers as will be clarified in what follows. The guiding strips 1 and 2 confine the light within the region of the guiding layer which they overlay and exhibit, starting from the front forward face 3, two straight front portions, labelled 1a and 2a, which extend, spaced apart, parallel to the X-axis and are prolonged rearwards by two front inflected portions 1b and 2b which are brought closer together, then by two close-together straight portions 1c and 2c, extending side-by-side parallel to the X-axis and constituting the active zone of the coupler K, by two rear inflected portions 1d and 2d which diverge from one another and are prolonged by two straight portions 1e and 2e, extending spaced apart parallel to the X-axis and ending respectively at the photodiodes D1 and D2.

In what follows, A, B and C will denote three regions of the structure, which are inter-delimited by two planes $P_{AB}$ and $P_{BC}$ perpendicular to the X-axis.

The guiding strips 1 and 2 extend over the regions A and B and the photodiodes D1 and D2 are made in region C. The plane $P_{AB}$ cuts the guiding strips 1 and 2 around the junction between the rear inflected portions 1d and 2d and the rear straight portions 1e and 2e.

Figure 2:
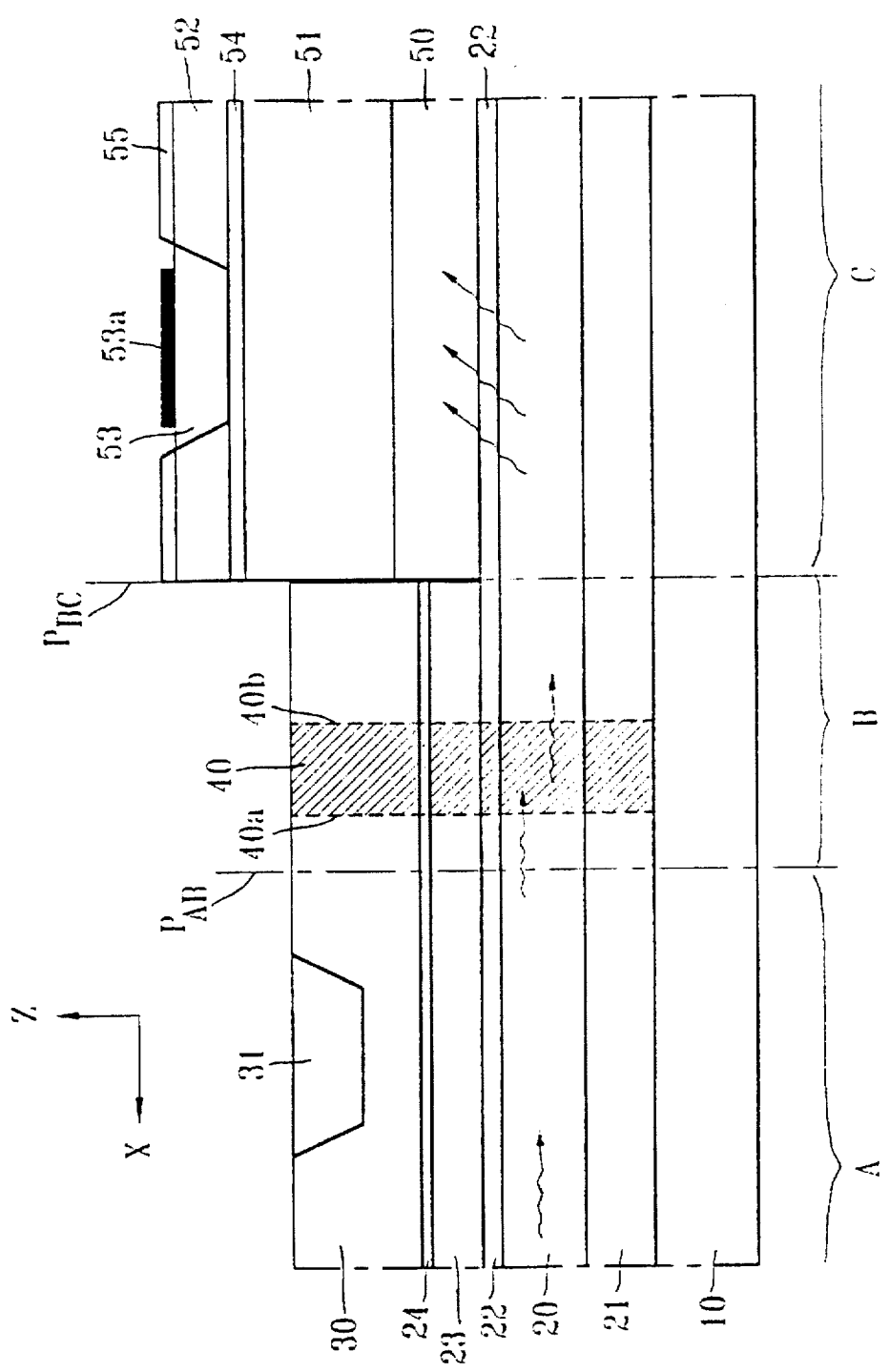
FIG. 2 is a juxtaposition of sections, in planes parallel to the XZ-plane, of the structure represented in FIG. 1.

The monolithic integrated structure represented in FIGS. 1 and 2 complies with a first embodiment of the invention. It includes a substrate 10 of semi-insulating material, represented in the Figures after dicing, under one of parallelepipedal shape elongated along the X-axis, the substrate consisting, in the embodiment described, of indium phosphide rendered semi-insulating by incorporation of iron (InP), and the resistance of which is greater than $10^7 \Omega cm$.

On the semi-insulating substrate assembly 10 are deposited, in succession, in a first epitaxy, for example by a method of metal-organic chemical vapour deposition (MOCVD) or by a method of molecular-beam epitaxy (MBE):

a) the lower confinement layer 21 of index $n_1$, consisting of InP, with a thickness of 0.5 µm, and n type conductivity, b) the optical guiding layer 20 of index $n_2$ greater than $n_1$, consisting of quaternary InGaAsP, of n or n-type conductivity and with a thickness of 0.65 µm, c) the upper confinement layer 22 of index $n_3$ less than $n_2$, with a thickness of the order of 0.05 µm, consisting of InP of n– type conductivity, d) an optical impedance matching layer 50, consisting of quaternary GaInAsP material of n+ type conductivity, with a thickness of 0.4 µm, e) an absorbent layer 51 of the PIN photodiode, consisting of ternary GaInAs material of n– type intrinsic conductivity, with a thickness of 0.9 µm, f) a thin layer 54 of quaternary GaInAsP material, intended to make, in a manner known per se, a gradual union with the following layer of binary material, with a thickness of 50 nm, g) an upper confinement layer 52 of the PIN photodiode, consisting of InP of n type conductivity, with a thickness of 0.4 µm, h) a thin contact layer 55 of the photodiode, consisting of ternary GaInAs material of conductivity type n, with a thickness of the order of 0.05 µm, and i) an InP-protection layer of the order of 0.1 µm for later resumption of the epitaxy and which does not appear in the drawing.

Next, in the part of the structure (regions A and B) on which the two optical guides of the coupler K will be made, the aforesaid InP-protection layer and layers 55, 52, 54, 51 and 50 are removed. A second epitaxy is then carried out on the thin upper confinement layer 22, laid bare, during which there are deposited, in succession, on regions A and B of the structure:

j) an upper confinement layer 23, consisting of InP, 0.15 µm in thickness, of the same composition as layer 22, k) a thin blocking layer 24, consisting of quaternary GaInAsP material, of n type conductivity, and thickness 25 nm, l) an upper confinement layer 30 consisting of InP, of n type conductivity, of thickness 0.8 µm and on which the guiding strips 1 and 2 will be etched.

A silicon nitride protection mask is then deposited on the entire structure followed by dry etching of this mask corresponding to the tracing of the guiding strips 1 and 2, which are next made by removing the upper confinement layer 30 from the unprotected parts.

After etching the guiding strips 1 and 2, a second protection mask, made from resin, is arranged on the entire structure, this mask exhibiting two windows 70 and 71 encompassing the inflected portions 1b, 2b and 1d and 2d of the guiding strips 1 and 2. The blocking layer 24 and upper confinement layers 22 and 23 are removed by chemical attack inside these windows so as to lay bare in these windows the upper face of the guiding layer 20, as represented in FIG. 1.

A new silicon nitride protection mask is next deposited on the entire structure, and a window taking the form of a slot extending throughout the width of the structure is made in this mask along a plane parallel to the YZ plane and which will serve in the making of an electrically insulating barrier 40, in accordance with a first implementation of the process according to the invention, by deep diffusion through this window down to the substrate 10, of an element of p+ type conductivity, advantageously zinc, intended to create a dual npn-junction directed along the X-axis, able to electrically insulate the two detection photodiodes D1 and D2 and the coupler K whilst allowing transmission of light between them. By way of illustration, at 500° C., about half an hour is required to diffuse through the thicknesses of about 1 µm of InP of the upper confinement layers 22, 23, 24 and 30, of 0.65 µm of quaternary material guiding layer 20 and of 0.5 µm of InP of lower confinement layer 21. The p+ doping is localized within the optical guides between two planes 40a and 40b which are mutually parallel and perpendicular to the X axis, these two planes 40a and 40b being situated in region B of n or n– type conductivity of the structure. The dual junction thus created in situ is equivalent to the head-to-tail mounting of two diodes, and opposes the traversal of the electric current whilst allowing passage of light in the optical guide.

In a variant of the first implementation of the process according to the invention, the formation may be envisaged of two insulating barriers exhibiting, starting from the surface of the structure and following the direction of the Z-axis, the form of coffers of rectangular transverse section, extending down to the substrate and inside which are situated the two photodiodes respectively.

In the event that not all of the layers forming the optical guide have a conductivity of the same type, or in the event that other layers of opposite conductivity type to that of the optical guide are deposited on the latter, electrical insulation will be effected by two deep dopings extending along two planes parallel to the YZ plane and offset along the X-axis. The dopings are performed with two elements of opposite conductivity types, in order to constitute two npn- and pnp-diode junctions mounted head-to-tail on each layer of conductivity of a given type.

The electrically insulating barrier 40 is situated in the example described in the path of the light within the optical guide.

It will be noted that it is also possible, without departing from the scope of the invention, to make the electrically insulating barrier in situ during the epitaxy by depositing, after step b) and before step c), on the guiding layer 20 of n or n– type conductivity, a layer of p+ type conductivity, and then depositing on the latter the upper confinement layer 22 of n or n– type conductivity. In this event, the electrically insulating barrier is situated in the path, of evanescent type, of the light leaving the optical guide and heading for the photodiode.

Four new windows, two of which are situated respectively on the close-together straight portions 1c, 2c of the guiding strips 1 and 2 and the other two on the contact layers 55 of the photodiodes D1 and D2, are created, after making the insulating barrier 40 by deep diffusion of zinc, on the same silicon nitride mask through which this diffusion is carried out. Zinc is diffused through these windows into layers 55 and 52 of the photodiodes so as to make two zones 53 of conductivity type p+ and zinc is diffused into layer 30 over half the thickness of the guiding strips 1 and 2 in order to make two zones 31 of p+ type conductivity of electrodes for balancing the coupler K.

It will be noted that it is advantageous for the layers 30 and 52 to be, as has just been described, made from the same material so as to allow simultaneous doping by diffusion of Zn into these layers.

Next, two respective electrical contacts 32 for the coupler K, each connected electrically to the adjacent diffused zone 31, are deposited on the blocking layer 24, laterally either side of the two close-together straight portions 1c and 2c of the guiding strips 1 and 2.

Likewise deposited by metallization on each photodiode D1 and D2 are n– and p-contacts labelled 55a and 53a respectively, connected electrically respectively, for each photodiode, to a part of the surface of the contact layer 55 situated outside the diffused zone 53 and to the latter.

Advantageously, the optical impedance matching layer 50 of quaternary material exhibits an index $n_4$ greater than the index $n_3$ of the upper confinement layer 22. The thickness of layer 50 is preferably chosen so that it constitutes an anti-reflection layer and its siting above the optical guide enables the time of transit of the carriers to be restricted. Layer 50 advantageously exhibits an optical index greater than that of the guiding layer so as to reduce the absorption length necessary for the transmission by evanescence of light leaving the optical guide and heading for the photodiode, and hence to restrict the capacity of the photodiode.

Next, the two photodiodes D1 and D2 are carved out on regions B and C of the structure, down to the substrate 10, by ion-beam etching (IBE) through a resin mask so as to end up with the configuration represented in FIG. 1. The region of carving extends from the plane $P_{AB}$ of the structure rearwards up to the rear forward face of the structure. The optical guides are carved out over their part overlaid by the rear straight portions 1e and 2e of the guiding strips 1 and 2, and the carved-out parts of the optical guides extend either side following the X-axis, of the insulating barrier 40, so that no electrical contact is possible between the parts of the optical guides extending forwards of the insulating barrier 40 and the photodiodes.

Next, an electrical contact support pad 60, made from polyimide, is made in a manner known per se, the upper face of which bears the reference 61 and on this support pad 60 are deposited, by metallization, contacts 66, 63 and 64 connected respectively to the n-contact 55a of the photodiode D1, to the p-contact 53a of the photodiode D1 and to the p-contact 53a of the photodiode D2. The contact 63 is likewise connected to the n-contact 55a of the photodiode D2 so that the two photodiodes D1 and D2 are thus connected electrically in series by way of the contact 63 of the support pad 60.

Figure 3:
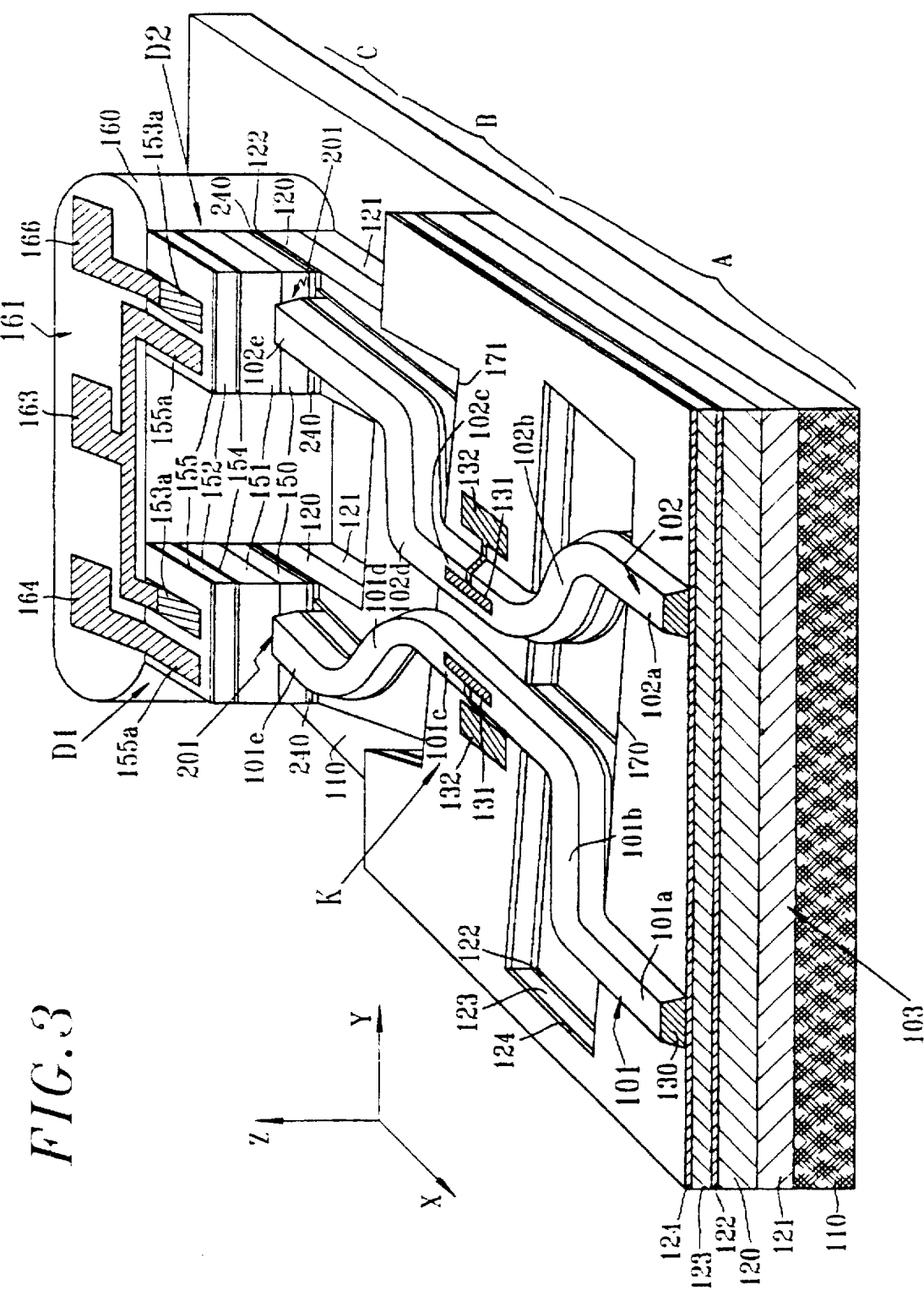
FIG. 3 is a diagrammatic, perspective view of a monolithic integrated structure in accordance with a second embodiment of the invention.
Figure 4:
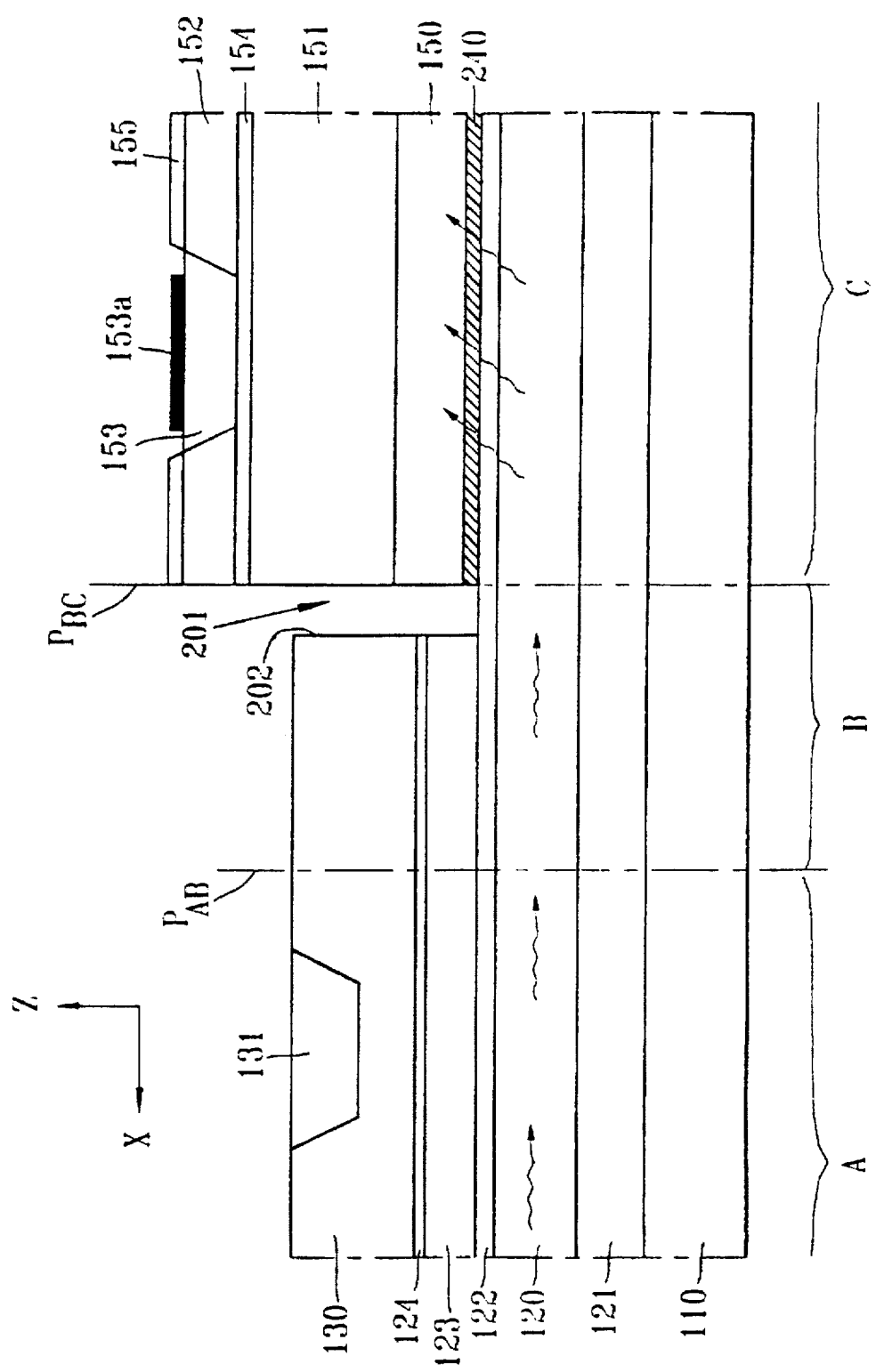
FIG. 4 is a juxtaposition of sections, in planes parallel to the XZ-plane, of the structure represented in FIG. 3.

FIGS. 3 and 4 represent a structure made in accordance with a second implementation of the process according to the invention.

The elements of the structure represented in FIGS. 3 and 4 which are identical to the elements which have been described earlier in connection with FIGS. 1 and 2 will be allocated an index simply increased by one hundred. Of course, the passages which correspond to the description of the making of these elements could be incorporated into the description which follows.

In this embodiment of the invention, the electrically insulating barrier is made by depositing, by epitaxy, a layer 240 of semi-insulating material on the upper confinement layer 122 of the optical guide at the time of the first epitaxy step during which the layers 150, 151, 154, 152 and 155 are also deposited. As a variant, layer 240 could conceivably be deposited directly onto the guiding layer 120.

Layer 240 advantageously consists of InP rendered semi-insulating by incorporation of iron (InP:Fe).

Layer 240 is next removed by chemical attack in regions A and B of the structure before the second epitaxy step in the course of which the layers 123, 124 and 130 will be deposited.

When etching the guiding strips 101 and 102, care will be taken also to etch trenches 201 separating the rear end face 202 of these strips from the plane $P_{BC}$ containing the front edge of the stack of layers constituting the photodiodes D1 and D2, in order to preclude any electrical contact short-circuiting the layer 240. The trenches 201 preferably have a width, measured along the X-axis, of the order of 3 μm and extend vertically down to layer 122. Unlike the last publication cited in the preamble of the application, it is not important here to make these trenches 201 with high precision since they have simply an insulating role and are not traversed by light.

The invention is not restricted to the two embodiments just described. In particular, a local oscillator connected optically to one of the guides of the coupler could conceivably be integrated on the structure.

We claim:

1. A process for making a monolithic integrated structure comprising the steps of:

depositing on a semi-insulating substrate, two opto-electronic components in semi-conductor material and an optical guide in semi-conductor material optically connecting said opto-electronic components, said optical guide comprising at least one first and one second superposed layers of opposite conductivity types, further comprising the steps of:

making in said optical guide, by localized implantation of a first doping element of a conductivity type opposite to the conductivity type of the first superposed layer, from the surface of the structure, a first electrically insulating and an optically transparent barrier of a type of conductivity opposite to the conductivity of said first superposed layer, forming a first dual junction transversely in said optical guide, and making in said optical guide, by localized implantation of a second doping element of a conductivity type opposite to said first doping element and opposite to the conductivity type of said second superposed layer, from the surface of the structure, a second electrically insulating and optically transparent barrier, longitudinally offset in regard of said first barrier, of a type of conductivity opposite to the conductivity of said second superposed layer, forming a second dual junction transversely in said optical guide.

2. The process of claim 1 wherein the step of making said electrically insulating and optically transparent barrier is operated by deep diffusion of said doping element.

3. The process of claim 1 wherein the step of making said electrically insulating and optically transparent barrier is operated by ion implantation of said doping element.

4. The process of claim 1 wherein said monolithic integrated structure is a heterodyne reception circuit comprising two detection photodiodes connected electrically in series and a 3 dB-coupler able to be electrically balanced, the coupler constituting one of said opto-electronic components and each photodiode constituting the other of said opto-electronic components.

* * * * *